(12) United States Patent
Willemse

(10) Patent No.: US 6,890,633 B2
(45) Date of Patent: May 10, 2005

(54) PROCESS FOR THE CONTINUOUS PRODUCTION OF A PREFORM MAT, AND A PREFORM AND ITS USE

(75) Inventor: Remco Cornelis Willemse, Weert (NL)

(73) Assignee: Trespa International B.V. (NL)

( * ) Notice: Subject to any disclaimer, the term of this patent is extended or adjusted under 35 U.S.C. 154(b) by 258 days.

(21) Appl. No.: 10/371,528

(22) Filed: Feb. 21, 2003

(65) Prior Publication Data

US 2003/0152793 A1 Aug. 14, 2003

Related U.S. Application Data

(62) Division of application No. 09/788,751, filed on Feb. 20, 2001, now Pat. No. 6,582,640.

(30) Foreign Application Priority Data

Mar. 3, 2000 (DE) .......................... 100 10 414

(51) Int. Cl.⁷ ........................... B32B 5/16; B32B 19/02; B32B 19/06
(52) U.S. Cl. .......................... 428/218; 428/90; 428/220; 428/326; 428/332; 428/337; 428/338
(58) Field of Search .......................... 428/90, 218, 220, 428/326, 332, 337, 338

(56) References Cited

U.S. PATENT DOCUMENTS

| | | | |
|---|---|---|---|
| 225,822 A | 3/1880 | Grossman | 264/123 |
| 3,518,157 A | 6/1970 | Terry et al. | 264/120 |
| 3,673,020 A | 6/1972 | DeJaeger | 156/62.2 |
| 4,228,116 A | 10/1980 | Colombo et al. | 264/119 |
| 4,480,061 A | 10/1984 | Coughlin et al. | 524/13 |
| 5,002,713 A | 3/1991 | Palardy et al. | 264/109 |
| 5,082,605 A | 1/1992 | Brooks et al. | 264/40.6 |
| 5,116,670 A | 5/1992 | Suzuki et al. | 428/285 |
| 5,173,230 A | 12/1992 | Colombo | 264/102 |
| 5,437,826 A | 8/1995 | Martinello et al. | 264/102 |
| 5,476,617 A | 12/1995 | English et al. | 264/37 |
| 5,480,602 A | 1/1996 | Nagaich | 264/122 |
| 5,800,884 A * | 9/1998 | D'Anna et al. | 428/35.7 |
| 5,804,116 A | 9/1998 | Schmid et al. | 264/104 |
| 5,911,932 A | 6/1999 | Dyksterhouse | 264/136 |
| 5,951,795 A | 9/1999 | Calvé et al. | 264/112 |
| 6,103,791 A | 8/2000 | Zehner | 524/13 |
| 6,248,813 B1 | 6/2001 | Zehner | 524/13 |
| 6,387,489 B2 * | 5/2002 | Willemse et al. | 428/359 |

FOREIGN PATENT DOCUMENTS

| | | |
|---|---|---|
| WO | WO 91/19754 | 12/1991 |
| WO | WO 98/50207 | 11/1998 |
| WO | WO 00/71620 A1 | 5/1999 |

* cited by examiner

Primary Examiner—Stephen J. Lechert, Jr.
(74) Attorney, Agent, or Firm—Roberts & Roberts, LLP

(57) ABSTRACT

From about 50 to about 90% by weight of fibers, in particular wood fibers, and/or pellets made from cellulose or from wood, are mixed with from about 10 to about 50% by weight of a hot-curing resin, each of the percentages by weight being based on the total weight of the mixture. Instead of a single resin it is also possible to use a mixture made from two or more hot-curing resins. The mixture made from fibers and/or pellets and resin is kneaded and homogenized and then passed on to an extruder which has various heating zones in which the mixture is heated. Care has to be taken here that the maximum temperature, arising at the extruder exit, does not exceed about 120° C., since above this temperature the resin(s) begin(s) to cure. The mixture, not entirely cured, is extruded as a homogeneous composition and introduced into a calender line in which pressure is exerted on the composition to an extent which gives a preform mat, the shape of which is stabilized, and which is then removed for further processing or storage.

20 Claims, 2 Drawing Sheets

PROCESS FOR THE CONTINUOUS PRODUCTION OF A PREFORM MAT, AND A PREFORM AND ITS USE

CROSS REFERENCE TO RELATED APPLICATION

This application is a division of U.S. patent application Ser. No. 09/788,751 filed Feb. 20, 2001 now U.S. Pat. No. 6,582,640, which is incorporated herein by reference.

BACKGROUND OF THE INVENTION

1. Field of the Invention

The invention relates to a process for the continuous production of a mat which is a preform for sheets, made from a mixture composed of fibers and/or pellets made from cellulose or wood and at least one hot-curing resin, and also to a preform and its use.

2. Description of the Related Art

U.S. Pat. No. 5,082,605 discloses a process for the production of a composite material which comprises a discontinuous phase of cellulose fibers, bonded and encapsulated within a continuous phase of a polymeric component, the polymeric component being composed mainly of polyethylene. The cellulose fibers have a ratio of length to diameter of from 2 to 12 and are mixed with the polymeric component, the temperature of the mixture being increased as far as the point of encapsulation. The encapsulated material is held within the encapsulation range while the particle size is reduced. The material is then extruded while its temperature is controlled within the encapsulation range. The fibers are essentially oriented in the direction of flow until the material reaches a heated die. Cellulose fibers and the polymeric material are mixed in a ratio of between about 40% by weight of polymer and 60% by weight of fibers and 60% by weight of polymer and 40% by weight of fibers, until the surface temperature of the mixture is between 143 and 177° C., or even higher. The surface temperature here depends on the polymeric material used. The mixture is then divided into portions whose maximum dimension is about 3.8 cm. These portions are then extruded, the temperature being held within the encapsulation temperature range. During the extrusion, the encapsulated fibers are essentially oriented in the direction of flow. The polymer is mainly a low-density polyethylene, but there may be a relatively small content of high-density polyethylene. There may also be a relatively small content of polypropylene in the polymer. Examples of products manufactured from the composite material are roofing shingles, floor tiles, panels, boards or frames for doors or for windows, and also items for the household or for gardens.

U.S. Pat. No. 4,228,116 describes formable sheets produced by continuous plastification and extrusion of an at least partially aggregated mixture made from 40 to 60% by weight of a thermoplastic resin, preferably polypropylene, and from 40 to 60% by weight of an organic, in particular cellulosic, filler material, such as wood particles. Before curing, the extruded material is rolled out to give a strip. This extruded, rolled-out strip is cut into sheets and these are used to manufacture, for example molded items, such as dashboards, instrument panels or other components for vehicles, or furniture or parts for furniture, or the like, by working the sheets at elevated temperature via pressing or other methods of forming, as are known in the prior art for the processing of thermoplastic materials. As an alternative, the sheets may be used for purposes for which sheets of timber or plywood are normally used.

WO 91/19754 discloses a mat impregnated with plastic and composed of a solvent-free plastic based on an epoxy resin and on a phenol novolak hardener, with an accelerator if desired. The proportion of volatile substances is below 0.5% by weight. To produce this mat, a solvent-free epoxy resin-phenol novolak mixture is heated to a temperature of from 60 to 140° C., at which the resin mixture has a viscosity of from 5 to 50 Pa.s. The preheated epoxy resin-phenol novolak mixture continuously permeates a web of fiber mat in a calender. The mat produced by this process has good storage stability and is suitable for producing hot-pressed, fully cured plastic parts with high resistance to chemicals and heat. An example of the fiber mat is a glass fiber mat.

It is a feature of the invention to provide a process which can extrude preforms with up to about 90% by weight of organic fiber content by conventional methods, without decomposition of the mixture. The feature extends to providing storage-stable preforms which can be used to mold fully cured sheets or sheet sections which have a substantially smooth or, where appropriate, a slightly structured surface.

This feature is achieved by means of a process which comprises:

(a) mixing from about 50 to about 90% by weight of fibers and/or pellets with from about 10 to about 50% by weight of hot-curing resin, where each of the percentages by weight is based on the total weight of the mixture, (b) kneading and homogenizing the mixture made from fibers and/or pellets which break down to give fibers, and from at least one hot-curing resin, and passing the mixture onward to an extruder, (c) heating the mixture in the extruder to an extruder exit temperature at which the resin begins to cure, (d) extruding the mixture, which has not entirely cured, as a homogeneous composition and distributing the homogeneous composition within a calender line, (e) exerting pressure onto the homogeneous composition in the calender line, to an extent which gives a mat which is a preform, and (f) removing the preform and stabilizing its desired shape.

Another procedure which achieves the feature is that of:

(a') mixing and kneading from about 50 to about 90% by weight of fibers and/or pellets which break down to give fibers, with from about 10 to about 50% by weight of hot-curing resin in an extruder, (b') varying extents of heating in the extruder of the mixture made from fibers and from at least one hot-curing resin, (c) heating the mixture in the extruder to an extruder exit temperature at which the resin begins to cure, (d) extruding the mixture, which has not entirely cured, as a homogeneous composition and distributing the homogeneous composition within a calender line, (e) exerting pressure onto the homogeneous composition in the calender line, to an extent which gives a mat which is a preform, and (f) removing the preform and stabilizing its desired shape.

The fibers used in the process are wood fibers whose moisture level is in the range from about 2 to about 50% by weight, in particular from about 10 to about 20% by weight. It is useful to knead the mixture in a mixer and then pass the same onward to an extruder from which the mixture is extruded without any back-pressure being exerted on the extruder screw. The hot-curing resins used in the process comprise thermosetting polymer compositions and/or resins with different extents of condensation, or are different types, or are mixtures of two or more of these resins. It is advantageous for the introduction of the resins to the mixer to be separate from that of the fibers and/or pellets. The extruder comprises zones with different temperatures, the temperature being controlled so that the temperature of the mixture is not more than about 120° C. at the exit from the extruder. The resin or thermosetting polymer composition preferably starts to cure or polymerize at this temperature which temperature however is preferably not high enough for full and entire polymerization or curing of the resin or of the mixture made from resin with fibers. In one embodiment of the process, the hot-curing resins have been selected from the group consisting of thermosetting polymers, phenolic resins, melamine resins, and epoxy resins.

The preform for hot-pressed, fully cured sheet sections or sheets made from a composite material made from fibers and from at least one hot-curing resin is composed of from about 50 to about 90% by weight of fibers and from about 10 to about 50% by weight of at least one hot-curing resin, the percentages by weight being based on the total weight of the composite material, where the resin of the preform has not entirely cured.

The preform is used as starting material for hot-pressed, fully cured sheet sections or sheets, by inserting one or more plies into a mold and fully curing these by hot-press molding.

SUMMARY OF THE INVENTION

The invention provides a process for the continuous production of a mat which is a preform for sheets, made from a mixture composed of fibers and/or pellets made from cellulose or from wood and at least one hot-curing resin, comprising the steps of (a) mixing from about 50 to about 90% by weight of fibers and/or pellets with from about 10 to about 50% by weight of hot-curing resin, where each of the percentages by weight is based on the total weight of the mixture, (b) kneading and homogenizing the mixture made from fibers and/or pellets which break down to give fibers, and from at least one hot-curing resin, and passing the mixture onward to an extruder, (c) heating the mixture in the extruder to an extruder exit temperature at which the resin begins to cure, (d) extruding the mixture, which has not entirely cured, as a homogeneous composition and distributing the homogeneous composition within a calender line, (e) exerting pressure onto the homogeneous composition in the calender line, to an extent which gives a mat which is a preform, and (f) removing the preform and stabilizing its desired shape.

The invention further provides a process for the continuous production of a mat which is a preform for sheets, made from a mixture composed of fibers and/or pellets made from cellulose or from wood and at least one hot-curing resin, comprising the steps of (a') mixing and kneading from about 50 to about 90% by weight of fibers and/or pellets which break down to give fibers, with from about 10 to about 50% by weight of hot-curing resin in an extruder, (b') varying extents of heating in the extruder of the mixture made from fibers and from at least one hot-curing resin, (c) heating the mixture in the extruder to an extruder exit temperature at which the resin begins to cure, (d) extruding the mixture, which has not entirely cured, as a homogeneous composition and distributing the homogeneous composition within a calender line, (e) exerting pressure onto the homogeneous composition in the calender line, to an extent which gives a mat which is a preform, and (f) removing the preform and stabilizing its desired shape.

The invention still further provides a preform for hot-pressed, fully cured sheet sections or sheets made from a mixture made from fibers and from at least one hot-curing resin, wherein the mixture is composed of from about 50 to about 90% by weight of fibers and from about 10 to about 50% by weight of at least one hot-curing resin, where the percentages by weight are based on the total weight of the mixture, and wherein the resin of the preform has not entirely cured.

The invention still further provides a process for the continuous production of a mat comprising:

(a) forming a mixture of from about 50 to about 90% cellulose or wood fibers and/or pellets by total weight of the mixture and from about 10 to about 50% of at least one thermosetting polymer composition by total weight of the mixture;

(b) kneading the mixture until substantially uniform;

(c) heating the mixture in an extruder to a temperature at which the thermosetting polymer composition of the mixture begins to at least partially polymerize, thereby forming a partially polymerized mixture;

(d) extruding the partially polymerized mixture as a homogeneous composition, and distributing the homogeneous composition within a calender line;

(e) exerting pressure on the homogeneous composition in the calender line, to thereby form mat which is a perform; and (f) removing the perform from the calender line.

The invention still further provides a process for the continuous production of a mat comprising:

(a) forming and kneading a mixture of from about 50 to about 90% cellulose or wood fibers and/or pellets by total weight of the mixture and from about 10 to about 50% of at least one thermosetting polymer composition by total weight of the mixture in an extruder until the mixture is substantially uniform;

(b) heating the mixture to various temperatures in the extruder to thereby modify and control the density of the mixture;

(c) heating the mixture in the extruder to a temperature at which the thermosetting polymer composition of the mixture begins to at least partially polymerize, thereby forming a partially polymerized mixture;

(d) extruding the partially polymerized mixture as a homogeneous composition and distributing the homogeneous composition within a calender line;

(e) exerting pressure on the homogeneous composition in the calender line to thereby form a mat which is a perform; and (f) removing the perform from the calender line.

The invention still further provides a preform for sheets formed from a mixture comprising cellulose or wood fibers and/or pellets and from at least one thermosetting polymer composition, wherein the mixture comprises from about 50 to about 90% cellulose or wood fibers and/or pellets by total weight of the mixture and from about 10 to about 50% of at least one thermosetting polymer composition by total weight

DETAILED DESCRIPTION OF THE PREFERRED EMBODIMENT

Figure 1:
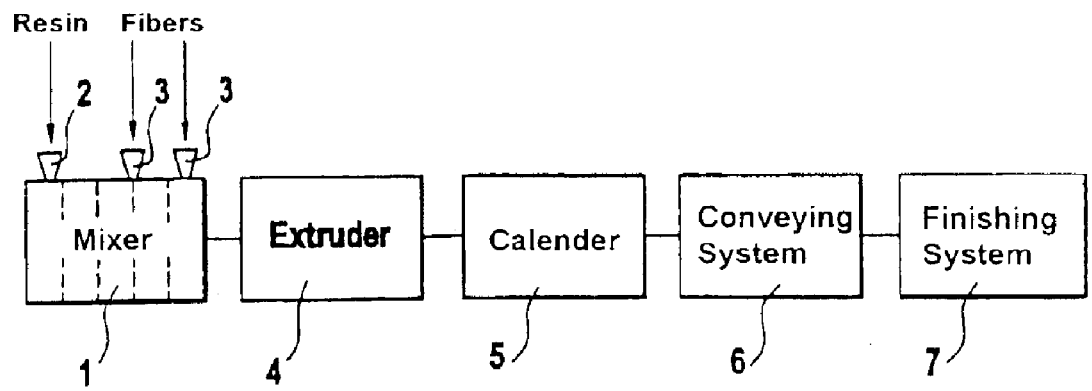
FIG. 1 shows a flow diagram for the individual steps in a first method of executing the process of the invention.

The invention provides a process which can extrude preforms with up to about 90% by weight of organic fiber content by conventional methods, without decomposition of the mixture. This extends to providing storage-stable preforms which can be used to mold fully cured sheets or sheet sections which have a substantially smooth or, where appropriate, a slightly structured surface.

The preform is preferably from a composite material made from fibers and from at least one hot-curing resin is composed of from about 50 to about 90% by weight of fibers and from about 10 to about 50% by weight of at least one hot-curing resin, the percentages by weight being based on the total weight of the composite material, where the resin of the preform has not entirely cured.

The preform is used as starting material for hot-pressed, fully cured sheet sections or sheets, by inserting one or more plies into a mold and fully curing these by hot-press molding.

One of the important constituents used in the process of the invention is wood particles, such as wood fibers, pellets, wood chips and/or wood flour. Lower lengths and diameters of the wood particles give smoother surfaces of the resultant preforms for sheets or sheet sections and allow higher densities of these preforms to be achieved. The wood particles used in the processes generally have a diameter or a width of less than/equal to about 3 mm and a length of from less than/equal to about 6 mm to less than/equal to about 60 mm, and the length/width ratio is therefore in the range from about 2 to about 20. If the wood chips have a length to width ratio of up to about 20, the resultant preforms have very smooth surfaces. If the width of the wood particles becomes smaller at constant length, or if the width remains the same while the length of the wood particles increases, the ratio of length to width can vary in the range from about 21 to about 40, and the surface of the resultant preforms is less smooth than the surface of the preforms which comprise thicker or, respectively, shorter wood particles. For certain types of sheets in which a rough surface structure is desirable it is possible to use preforms manufactured from elongated wood particles or wood fibers.

Fibers are moreover understood to be cellulose fibers and/or wood fibers, and the pellets also embrace both wood pellets and cellulose pellets. Pellets are used mainly when the bulk density of the mixture is to be higher than can be achieved using loose fibers.

The fibers are generally dried in advance so that their moisture content is from about 2 to about 50% by weight, in particular from about 10 to about 20% by weight. Like the resins, the fibers may also, of course, be dried prior to extrusion to a moisture content below about 10% by weight, and in particular from about 5 to about 2% by weight, if inexpensive energy is available for the drying procedure. Excessive moisture in the fibers adversely affects their bonding to the second important constituent in the process, namely a hot-curing resin or a mixture made from at least two hot-curing resins. Excessive moisture increases the processing time and the energy cost required to reduce the moisture level of the fibers. If the initial moisture level is not excessively high, up to about 20% by weight, no predrying of the fibers is required, since a high proportion of water evaporates due to the heat generated in the extruder and the large surface areas of the fibers, which have some degree of separation from one another when they leave the extruder, and therefore the moisture content of the preforms is below about 10% by weight, and in most cases indeed below about 7% by weight. This is a requirement for avoiding the occurrence of blisters or craters in the preform.

The hot-curing resin(s) used in the process comprise at least one thermosetting polymer composition and/or resin with different extents of condensation, or are different types, or are mixtures of two or more of these resins. In one embodiment of the process, the hot-curing resins have been selected from the group consisting of thermosetting polymers, phenolic resins, melamine resins, epoxy resins, and combinations thereof. Such hot-curing resins preferably have a viscosity of at least about 0.05 Pa.s. The range of viscosity of the resins can extend from about 0.05 to about 100 Pa.s. Where possible, the resins are free from water and/or solvent. If the resins comprise water or a solvent, this constituent of the resins is removed by appropriate known methods during the extrusion or after the calendering of the composite material composed of one or more hot-curing resins and of the fibers. Appropriate thorough predrying of the fibers and of the resins prior to extrusion can substantially reduce the requirement for disposal of waste water, since very little waste water then arises.

If required, additives from the group consisting of mineral particles, radiation stabilizers, catalysts, and color pigments are added to the mixture made from fibers and/or pellets and from hot-curing resins.

In one preferred version of the invention, from about 50 to about 90% by weight of fibers and/or pellets are mixed with from about 10 to about 50% by weight of one or more hot-curing resins, each of the percentages by weight being based on the total weight of the mixture. The relative percentages by weight of the fibers and/or pellets and of the resin(s) are variable and depend on various parameters, such as the type and particle size, and also moisture level in the fibers and/or pellets, and on the viscosity of the resin(s). By altering these percentages by weight, the physical properties of the mixture from which the preforms are produced can be adjusted as desired.

As shown in the diagram of FIG. 1, hot-curing resin 2 and fibers and/or pellets 3 are introduced separately to a mixer 1. Two types of fibers and/or pellets may be fed here. Instead of a resin, it is also possible to supply the mixer 1 with a mixture made from two or more hot-curing resins. It is also possible to feed more than two types of fibers and/or pellets, differing from one another in density and length to diameter ratio. The use of pellets made from cellulose or from wood instead of loose fibers can substantially increase the bulk density achieved, by up to about 100%. The use of pellets instead of fibers simplifies the feeding procedure. Depending on the bulk density required, use is made only of fibers, only of pellets, or else of combinations of fibers and pellets.

The mixer 1 comprises kneading equipment, and the fibers and/or pellets 3 are homogeneously incorporated into the hot-curing resin 2. It is advantageous for the introduction of the resins to the mixer to be separate from that of the fibers and/or pellets.

Care has to be taken here that the temperature of the homogeneous mixture does not exceed the temperature of about 120° C. at which full curing of the resin, or of the resins, if a mixture of two or more hot-curing resins is used, takes place. Use may be made here of hot-curing resins 2 with varying extents of condensation, and of different types. The bulk density of the fibers is from about 50 to about 300 kg/m$^3$ and in particular from about 130 to about 150 kg/m$^3$ and from about 250 to about 270 kg/m$^3$. The mixer 1 is composed, for example, of a number of compartments and has an effective length of about 40 D, D being the diameter of the mixer screw. The fibers 3 are homogeneously incorporated into the hot-curing resin 2 by the kneading equipment. The resin is metered volumetrically by a piston pump into the first compartment of the mixer. Fibers with a bulk density of about 50 kg/m$^3$, for example, are metered together with another type of fiber whose bulk density is from about 250 to about 270 kg/m$^3$, in particular about 256 kg/m$^3$. The fiber type with the low bulk density here is metered volumetrically, whereas the fiber type with higher bulk density is metered gravimetrically. These materials are metered into the third and fifth compartments of the mixer, for example. It is also possible for more than two different types of fiber to be fed, differing from one another in their densities and ratio of fiber length to fiber diameter.

In another procedure, just one single type of fiber with bulk density from about 250 to about 270 kg/m$^3$, in particular about 256 kg/m$^3$, is introduced into the third and fifth compartment. In another instance, a single type of fiber with a bulk density of from about 130 to about 150 kg/m$^3$, in particular about 140 kg/m$^3$, is fed into the resin via the third and fifth compartment by gravimetric metering.

Besides fibers, use may also be made of pellets made from cellulose or wood. The pellets are produced by compressing fibers made from wood or cellulose, without using any binders. Pellets may also be obtained from wood flour, fibers of A or B type, or from other types of fiber, by compression. The bulk density of the pellets is between about 400 and about 500 kg/m$^3$ and is inversely correlated with the dimensions of the pellets. Use may be made here of combinations made from different fiber types, fibers and pellets, or made solely from types of pellet. The selection of any particular combination depends on the density desired for the preform to be produced.

The table below gives data for some mixing specifications for preforms. The preforms generally have a moisture content below about 10% by weight and extending to about 2 to about 5% by weight.

| Pre-form No. | Wood fiber type (% by weight) | Bulk density (kg/m$^3$) | Resin type (% by weight) | Through-put (kg/h) | Temperature (° C.) |
|---|---|---|---|---|---|
| 1 | A (70) | 256 | Phenolic resin (30) | 100 | 60 |
| 2 | A (70) | 256 | Phenolic resin (30) | 100 | 60 |
| 3 | B (70) | 140 | Phenolic resin (30) | 100 | 100 |
| 4 | C (42) + A (28) | 50 + 256 | Phenolic resin (30) | 100 | 100 |
| 5 | C (42) + A (28) | 50 + 256 | Phenolic resin (30) | 100 | 60 |
| 6 | B (70) | 140 | Phenolic resin (30) | 100 | 60 |
| 7 | B (70) | 140 | Phenolic resin (30) | 100 | 120 |

All of the mixes could be processed without difficulty in the mixer, and the only difficulty experienced was in the metering of a particular type of wood fiber, namely type B, which tended to bridge. The difficulties with feeding could be eliminated very simply by using pellets instead of fibers. Using these, the throughput given in the table above can be increased by up to about 100%. The relatively high level of friction in the mixer breaks down the pellets to give fibers, which become enclosed by the resin(s). Substantially homogeneous incorporation of the wood fibers per se into the resin took place at temperatures of from about 60 to about 120° C.

It is useful to knead the mixture until at least substantially uniform or homogenous in a mixer and then pass the same onward to an extruder from which the mixture is extruded without any back-pressure being exerted on the extruder screw. The homogeneous mixture is supplied from the mixer 1 to an extruder 4, whose screw configuration has been appropriately adapted for extruding the mixture made from fibers and resins. The fibers have been enclosed by the resin.

The extruder comprises zones with different temperatures, the temperature being controlled so that the temperature of the mixture is not more than about 120° C. at the exit from the extruder. The compression zone of the extruder may be cooled in order to ensure that in no section of the extruder 4 does the mixture exceed the temperature of about 120° C. above which full curing of the resin begins and proceeds rapidly to completion. If short fibers are used, there is then so little friction in the compression zone of the extruder that heating, rather than cooling, of this zone is needed. The resin or polymer composition preferably starts to at least partially cure or polymerize at this temperature, which temperature however is preferably not high enough for full and entire polymerization or curing of the resin or of the mixture made from resin with fibers The homogeneous mixture made from fibers and resin and discharged from an extruder 4 is introduced into a calender 5 whose nip can be set at from about 0.4 to about 10 mm. The homogeneous composition or mixture is spread by the rolls of the calender 5 to give a mat width from about 100 to about 4000 mm, and then introduced to finishing equipment 7 via conveying equipment 6, for example a conveyor belt. In the finishing equipment 7 the length of the preform mat is cut to give the formats desired, which are then further processed to sheets, or placed in intermediate storage.

Figure 2:
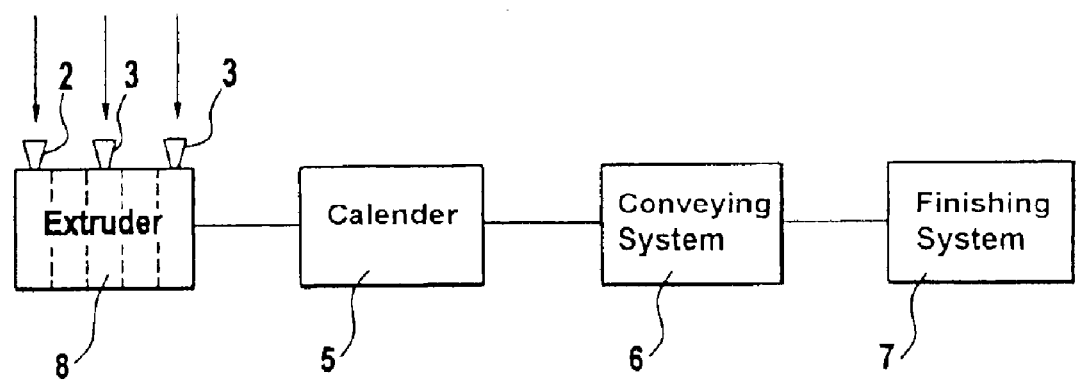
FIG. 2 shows a flow diagram for the individual steps in a second method of executing the process of the invention.

FIG. 2 shows that the mixer can be dispensed with in producing the preforms, and instead the resin 2 and two different types of fiber 3 are metered into an extruder 8 which is a twin-screw extruder with kneading equipment arranged downstream of the inlet aperture for fibers 3. The kneading equipment is nonreversing elements utilized for achieving a more thorough degree of mixing. Reversible kneading elements cannot be used, since these would cause excessive pressure of the mixture made from fibers and resin onto the screw, resulting in blocking of the same. The temperature rise brought about by friction in the extruder can be restricted by using an open-ended extruder, i.e. one which has no die, thus preventing any back-pressure from arising in the extruder. This measure also permits the use of kneading elements to improve the thoroughness of mixing. The temperature of the extruder is thus regulated and controlled so that it does not exceed about 120° C. either within the extruder or at the exit from the extruder, since at temperatures above about 120° C. full and entire polymerization or curing of the thermosetting polymer composition (s) or resin(s) begins to take place. The extent to which the material is heated in the extruder 8 generally makes it unnecessary to use additional heating, e.g. outside the extruder.

As in the procedure in FIG. 1, the extruded mixture is passed to the calender 5, and from this to finishing equipment 7 via conveying equipment 6.

Figure 3:
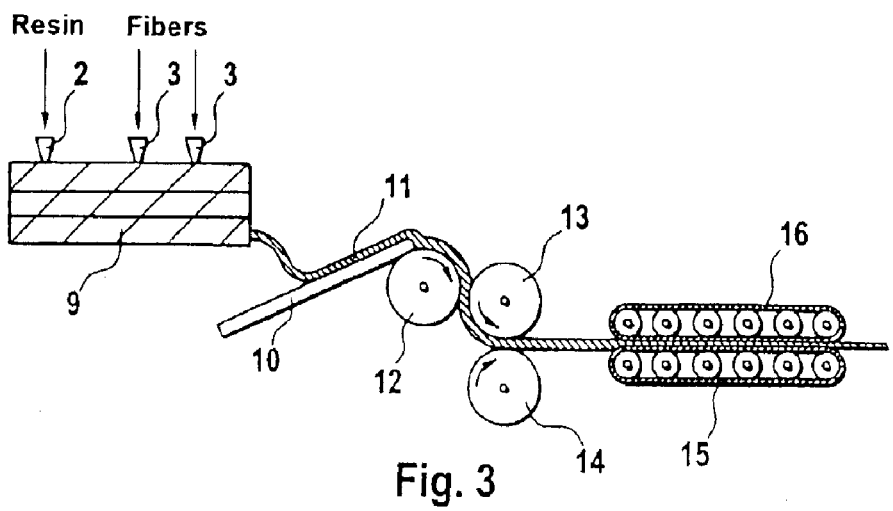
FIG. 3 shows a diagram of equipment for carrying out the second method of executing the process of the invention, as shown in FIG. 2.

FIG. 3 is a diagram of the equipment for carrying out the process in FIG. 2. An extruder 9, corresponding to the extruder 8 in FIG. 2, has up to ten heating zones whose temperatures have been controlled to cover a temperature range of from about 27° C. to 35° C. and, respectively, from about 50°C. to 60° C. to from about 106° C. to 115° C. and not more than about 120° C. at the exit from the extruder. A resin 2 or a resin mixture made from two or more curable resins is first introduced to the extruder followed by, in succession, a variety of fibers 3. The moisture can be removed from the resins and from the fibers by reduced-pressure devolatilization in the extruder 9. It is also possible for the moisture to be removed downstream of the kneading elements of the extruder, by using an extruder barrel which is open at that location, so that the temperature prevailing, from about 100° C. to about 120° C., can cause the moisture to evaporate. From the extruder 9 the mixture 11 is extruded continuously onto an inclined supply device 10 which supplies a calender, for example ones having three calender rolls 12, 13, 14. The calender may also embrace four to six calender rolls. The supply device 10 is usually a conveyor belt which has an adjustable reciprocating movement across the width of the mixture 11 in the first nip between the two calender rolls 12 and 13. Since more mixture is drawn off at the terminal points of the reciprocating movement of the conveyor belt than in the middle of the calender rolls 12, 13, the conveyor belt pauses for a certain period at the terminal points. The belt speed for the conveyor belt and the extent and speed of the traverse movement are adjustable, as is the period of pause at the terminal points. Instead of a traversing conveyor belt it is also possible to use any other conveyor equipment which carries the mixture 11 to the calender rolls. The supply device 10 in particular permits the processing of relatively long fibers. In the event that the extruder 9 supplies material to a slot die, a precondition for which is that the fibers being processed are relatively small, the supply device and in some cases the calender can be dispensed with, and the mixture 11 introduced directly from the slot die to the belt conveyors. The pressure exerted by the calender rolls onto the mixture 11 is such as to mold a stable mat in the nip between calender rolls 13 and 14. The width of the mat is from about 100 to about 4000 mm. After leaving the calender, the preform mat passes onto a belt conveyor 15, 16 which stabilizes the preform mat. An example of a belt conveyor is one composed of two endless conveyor belts which run around rollers and whose action on the preform mat is similar to that of a continuous press, and which form a gap through which the preform proceeds.

The curing of the resin or of the resin mixture in the preform is terminated by the calender rolls 13, 14, which are heated to temperatures below about 120° C. or cooled to room temperature or below, or by the conveyor belts 15, 16, since each of these cools the preform to below about 120° C. The density of the preform can be controlled for relatively high densities by regulating the temperature of the mixture 11. The density is from about 250 kg/m$^3$ to about 1250 kg/m$^3$, and may moreover be controlled within this range by using shorter fibers for higher density.

Figure 4:
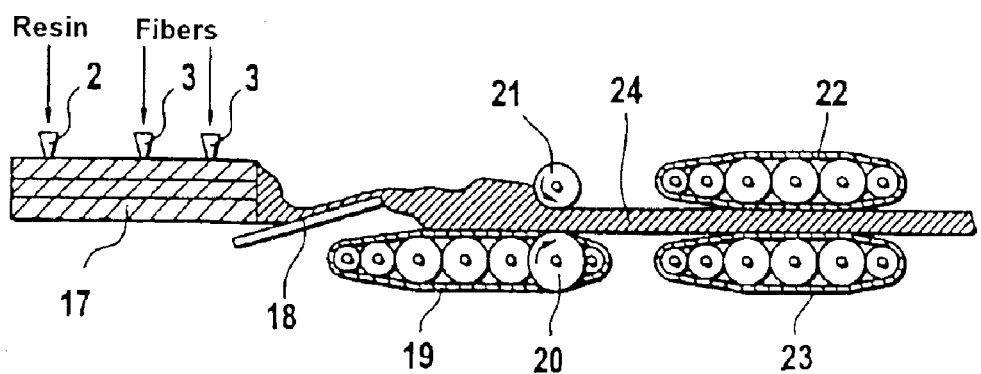
FIG. 4 shows other equipment for carrying out the process, as in the diagram of FIG. 2.

FIG. 4 is a diagram of other equipment for carrying out the process in FIG. 2. An extruder 17 has up to ten heating zones whose temperatures cover a temperature range of from about 27° C. to about 35° C. and, respectively, from about 50° C. to about 60° C. to from about 106° C. to about 115° C. and not more than about 120° C. at the exit from the extruder. A resin 2 or a resin mixture made from two or more curable resins is first introduced to the extruder 17 followed by, in succession, a variety of fibers 3 or pellets or a variety of fibers and pellets. The mixture is continuously extruded onto an inclined supply device 18 which supplies a conveyor belt 19. This supply device 10 in FIG. 3 and its function have been described above in connection with FIG. 3, to which reference is made here in order to avoid repetition. The supply device 18 spreads a mat on the conveyor belt 19. Two rollers 20, 21 compact this mat to give a stable mat 24 of width from about 100 to about 4000 mm. As required, the rollers 20, 21 are either cooled, so that the hot spread mat is cooled, or are heated if the mixture from the extruder has to be raised to the temperature required for partial curing. The stable mat 24 passes through a gap between two conveyor belts of a belt conveyor 22, 23, whose action on the mat 24 is similar to that of a continuous press, and which stabilize the mat to give a finished preform.

Advantages achieved by the invention are that preforms of different widths can be produced and that fibers of different length and width are used, and that use can be made of resins differing in their extent of condensation or in the way in which the resins have been mixed with one another or in the types of resin used, and that these are materials not usually suitable for applying resin on a blowing line. In the mixtures made from fibers and resin, two or more resins can be mixed with the fibers, and separate introduction of these resins to the mixer and, respectively, the extruder is possible here. This makes it possible to use a resin mixture adapted to achieve the desired quality and nature of the surface of the preform. If no decorative layers and no coverings are used in producing the sheets from the preforms, these may be given greater dimensional stability or a particular desired appearance by adding additives, such as mineral particles, radiation stabilizers, catalysts, or color pigments, to the mixture made from fibers and hot-curing resin and, respectively, from curable resins. The extent of addition of the additives is from about 1 to about 20% by weight, based on the weight of the preform. The preforms are used as starting material for producing hot-pressed, fully cured sections or sheets, the complete and full curing of the preforms, which have not been entirely cured, taking place during hot-pressing. The preforms here may be hot-pressed as a single layer or, depending on the desired thickness of the sheet, two or more layers of preforms may be hot-pressed together with decorative layers or with other layers. During the hot-pressing it is always a requirement that the resin or resin mixture of the preform becomes completely and fully cured. The resin(s) of the preforms has/have a viscosity of at least about 0.05 Pa.s, and up to about 100 Pa.s. Different types of fiber give marked differences in the density of the preforms. The higher the bulk density of the fibers, the higher the density of the preform. One of the findings here is that when using wood fiber type A, as in the table, with a bulk density of about 260 kg/m$^3$ the density of the preform is fairly independent of the temperature in the range from about 60° C. to about 100° C. In contrast, the density of the preform which uses wood fiber type B with a bulk density of about 140 kg/m$^3$ is temperature-dependent in the temperature range from about 60° C. to about 120° C., the density increasing as temperature rises, giving a density of about 450 kg/m$^3$ at about 60° C. and a density of about 550 kg/m$^3$ at about 120° C. Using this type of wood fiber, preform densities of from 500 to 700 kg/m$^3$ can be achieved in the temperature range from about 60° C. to about 120° C. by increasing the pressure in the calender and increasing the temperature. Wood fiber type A, which is substantially cubic in shape, cannot be further compacted to any significant extent by increasing the temperature, and has an almost constant density of between about 590 kg/m$^3$ and about 660 kg/m$^3$ in the temperature range from about 60° C. to about 120° C., even if the pressure is increased. Using wood fiber type B in particular, preforms with a very smooth surface can be produced. At wood fiber bulk densities below about 140 kg/m$^3$, the preforms obtained have a slightly roughened surface structure.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A preform for sheets, made from a mixture composed of fibers and/or pellets made from cellulose or from wood and at least one hot-curing resin, produced by a process comprising the steps of
    (a) mixing from about 50 to about 90% by weight of fibers and/or pellets with from about 10 to about 50% by weight of hot-curing resin, where each of the percentages by weight is based on the total weight of the mixture,
    (b) kneading and homogenizing the mixture made from fibers and/or pellets which break down to nave fibers, and from at least one hot-curing resin, and passing the mixture onward to an extruder,
    (c) heating the mixture in the extruder to an extruder exit temperature at which the resin begins to cure,
    (d) extruding the mixture, which has not entirely cured, as a homogeneous composition and distributing the homogeneous composition within a calender line,
    (e) exerting pressure onto the homogeneous composition in the calender line, to an extent which gives a mat which is a preform, and
    (f) removing the preform and stabilizing its desired shape.

2. The preform as claimed in claim 1, wherein the fibers are wood fibers whose moisture level is in the range from about 2 to about 50% by weight.

3. The preform as claimed in claim 1, wherein the resins and the fibers and/or pellets are predried to a moisture level of from about 2 to about 5% by weight prior to extrusion.

4. The perform as claimed in claim 1, wherein use is made of hot-curing resins with different extents condensation, or of different types, or of mixtures of two or more of these resins.

5. The preform as claimed in claim 1, wherein fibers of one, two or more types, with different densities and different ratios of fiber lengths to fiber diameters, and/or pellets, are fed to the mixer.

6. The preform as claimed in claim 1, wherein the hot-curing resins have been selected from the group consisting of phenolic resins, melamine resins, arid epoxy resins.

7. The preform as claimed in claim 6, wherein the hot-curing resins have a viscosity of at least about 0.05 Pa.s.

8. The preform as claimed in claim 7, wherein the resins have a viscosity in the range from about 0.05 to about 100 Pa.s.

9. The preform as claimed in claim 7, wherein the resins are free from water and/or solvent.

10. The preform as claimed in claim 7, wherein the resins comprise water or a solvent and these are removed during the extrusion or after the calendering.

11. The preform as claimed in claim 1, wherein additives selected from the group consisting of mineral particles, radiation stabilizers, catalysts and color pigments are added to the mixture made from fibers and/or pellets and from hot-curing resin(s).

12. The preform as claimed in claim 11, wherein use is made of fibers with a bulk density of from about 50 to about 300 kg/m$^3$ and of pellets with a bulk density of from about 400 to about 500 kg/m$^3$.

13. The preform as claimed in claim 1, wherein the temperatures and pressures applied to the mixture made from fibers and from hot-curing resin(s) and to the preform mat are selected so as to give the finished perform a density of from about 250 to about 1250 kg/m$^3$.

14. The preform as claimed in claim 1, wherein the width of the preform mat is in the range from about 100 to about 4000 mm.

15. A preform for hot-pressed, fully cured sheet sections or sheets made from a mixture made from fibers and from at least one hot-curing resin, wherein the mixture is composed of from about 50 to about 90% by weight of fibers and from about 10 to about 50% by weight of at least one hot-curing resin; where the percentages by weight are based on the total weight of the mixture, and wherein the resin of the preform has not entirely cured.

16. The preform as claimed in claim 15, wherein the fibers are wood fibers with a bulk density of from about 50 to about 300 kg/m$^3$.

17. The preform as claimed in claim 15, whose density is from about 250 to about 1250 kg/m$^3$.

18. The preform as claimed in claim 15, wherein the hot-curing resin is a resin selected from the group consisting of phenolic resins, melamine resins, and epoxy resins, and wherein the resin is a single resin or a mixture of two or more resins selected from the group.

19. The preform as claimed in claim 15, which comprises additives, such as mineral particles, radiation stabilizers, catalysts and/or color pigments at from about 1 to about 20% by weight.

20. A preform for sheets formed from a mixture comprising cellulose or wood fibers and/or pellets and from at least one thermosetting polymer composition, wherein the mixture comprises from about 50 to about 90% cellulose or wood fibers and/or pellets by total weight of the mixture and from about 10 to about 50% of at least one thermosetting polymer composition by total weight of the mixture, and wherein the thermosetting polymer composition of the preform has at least partially polymerized.

* * * * *